US 6,445,386 B1

(12) United States Patent
Cook et al.

(10) Patent No.: US 6,445,386 B1
(45) Date of Patent: *Sep. 3, 2002

(54) METHOD AND APPARATUS FOR STRETCH BLITTING USING A 3D PIPELINE

(75) Inventors: Val G. Cook, Shingle Springs; Sam W. Jensen, Fair Oaks, both of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/231,260

(22) Filed: Jan. 15, 1999

(51) Int. Cl.[7] .......................... G06F 15/00; G06F 17/00
(52) U.S. Cl. ........................ 345/419; 345/418; 345/593; 345/606; 345/506; 345/522
(58) Field of Search ............................... 345/418, 419, 345/434, 439, 472, 112, 502, 505, 506, 520, 521, 522, 523, 153, 155, 514, 430, 433, 503, 515, 593, 597, 600, 603, 604, 606, 612, 613, 587–592

(56) References Cited

U.S. PATENT DOCUMENTS

| | | | |
|---|---|---|---|
| 4,727,365 A | 2/1988 | Bunker et al. | 340/728 |
| 5,363,119 A | 11/1994 | Snyder et al. | 345/131 |
| 5,384,904 A | 1/1995 | Sprague et al. | 395/139 |
| 5,748,789 A | 5/1998 | Lee et al. | 382/243 |
| 5,870,105 A | 2/1999 | Jensen | 345/441 |
| 5,892,518 A | 4/1999 | Mizobata et al. | 345/431 |
| 5,946,419 A | 8/1999 | Chen et al. | 382/243 |
| 5,974,184 A | 10/1999 | Eifrig et al. | 382/236 |
| 5,990,911 A | * 11/1999 | Arrott | 345/506 |
| 5,991,447 A | 11/1999 | Eifrig et al. | 382/236 |
| 6,009,190 A | 12/1999 | Szeliski et al. | 382/154 |
| 6,025,855 A | * 2/2000 | Meinerth | 345/514 |
| 6,067,090 A | * 5/2000 | Sreenivas | 345/431 |
| 6,072,505 A | 6/2000 | Piazza et al. | 345/501 |
| 6,078,339 A | * 6/2000 | Meinerth | 345/522 |
| 6,111,584 A | * 8/2000 | Murphy | 345/430 |
| 6,229,553 B1 | * 5/2001 | Duluk | 345/506 |
| 6,268,875 B1 | * 7/2001 | Duluk | 345/506 |

OTHER PUBLICATIONS

"Fixed Blitter (BLT) and Stretch Blitter (STRBLT) Engines," Intel 740TM Graphics Accelerator Datasheet; Intel Corporation, Apr. 1998; 11 pages.

Fujishima et al., "Hybrid Media–Processor Core for Natural and Synthetic Video Decoding," ISCAS '99, May 30–Jun. 2, 1999, pp. 275–278, vol. 4, Piscataway, NJ, USA.

Ostermann, J. and Puri, Atul, "Natural and Synthetic Video in MPEG–4", International Conference on Acoustics, Speech & Signal Processing, 1998, pp. 3805–3808, vol. 6, New York, NY, USA.

Stegner, Axel, et al., "Evaluation of MPEG Motion Compensation Algorithms," Computer Science Dept. of Univ. of Auckland CITR at Tamaki Campus, Oct. 1997, 4 pages.

Tudor, P.N., "MPEG–2 Video Compression," IEE J Langham Thompson Prize, Electronics & Communication Engineering Journal, Dec. 1995, 11 pages.

Patent Abstracts of Japan, Publication #10049666 dated Feb. 20, 1998, Application #09115895, 1 pg.

PCT Search Report, Int'l Application PCT/US00/00784, mailed May 11, 2000, 4 pgs.

* cited by examiner

*Primary Examiner*—Matthew Luu
*Assistant Examiner*—Wesner Sajous
(74) *Attorney, Agent, or Firm*—Blakely Sokoloff Taylor & Zafman LLP

(57) ABSTRACT

A method and apparatus for image scaling is provided. A 3D pipeline comprises a command stream controller to enable a rectangle mode. The 3D pipeline including a windower to produce addresses for the rectangle defined by the vertices. A filter interpolates between neighboring points, based on relative location, to generate attributes for each pixel. A color calculator aligns output data and writes the output data to a destination surface.

30 Claims, 6 Drawing Sheets

| 410 | 420 | 430 | 440 |

| 0 1 2 3 | 16 17 18 19 | 32... | 48... |
| 4 5 6 7 | 20 21 22 23 | | |
| 8 9 10 11 | 24 25 26 27 | | |
| 12 13 14 15 | 28 29 30 31 | | |

400

| 450 | 460 | 470 | 480 |

FIG. 4

METHOD AND APPARATUS FOR STRETCH BLITTING USING A 3D PIPELINE

FIELD OF THE INVENTION

The invention relates to graphics display by electronic devices. More particularly, the invention relates to stretch blitting operations of graphics that are displayed by electronic devices.

BACKGROUND

Personal computers have been working their way into daily household use for over two decades. Games for education and entertainment, already have strong applications for the PC and are enhanced by the introduction of 3D graphics. Real-time photo-specific textured 3D graphics will provide accurate simulations of real world locations, viewable with full viewpoint freedom.

The key to high quality real-time 3D graphics is to have a system architecture and memory access scheme that supports the rendering of cluttered scenes where there are several layers of objects driving up the number of pixel memory accesses. The associated processing loads must not reduce system update rate below what we consider real-time (30 Hz). Some proposed solutions off-load processing onto the application's shoulders and thus have trouble rendering simple scenes in real-time. Better accelerators will accelerate those hardware functions that are processor-intensive, leaving the processor free for high-level functions. Generally, custom acceleration hardware (ASIC—silicon) executes rendering functions much faster, leaving more time for the software application. This graphics 3D rendering engine, or 3D pipeline, uses a significant number of multiplication and addition circuits.

Video conferencing and other video image manipulation is also coming to the desktop. One desirable feature to be used in a video teleconference is the ability to scale a video image to various sizes prior to transmission. Smaller images, while providing less detail, require less communication bandwidth and can be reproduced by a recipient computer more quickly. Generally, a camera will generate a video image having a maximum size defined by the camera's image sensor. The image can then be scaled to a smaller or larger image by a scaling apparatus.

Existing video cameras that employ digital filtering of source pixels to provide a scaled output are designed to produce each output pixel in a single cycle of the source pixel clock. In other words, each of the taps of a multi-tap filter must be applied in the same clock cycle. Consequently, a significant number of multiplication and addition circuits are required to process each separate filter tap in parallel. As the number of multiplication and addition circuits increases, filter propagation delay and power consumption also increase. Further, where the scaling apparatus is implemented in an integrated circuit (IC), the increased number of multiplication and addition circuits translates to an increased die size of the implementing IC. The net result is a more expensive scaling engine.

As computer systems include 3D rendering as well as video imaging systems, the hardware assist for speeding up calculations is becoming expensive in terms of area as well as gates. Therefore, it would be advantageous if the number of gates for an imaging system including three-dimensional rendering and video scaling would be reduced.

SUMMARY OF THE INVENTION

A method and apparatus for image scaling is provided. A 3D pipeline comprises a command stream controller to enable a rectangle mode. The 3D pipeline including a windower to produce addresses for the rectangle defined by the vertices. A filter interpolates between neighboring points, based on relative location, to generate attributes for each pixel. A color calculator aligns output data and writes the output data to a destination surface.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrates a destination data for a sixteen-by-twelve rectangle.

DETAILED DESCRIPTION

A method and apparatus for stretch blitting of graphics with a texture mapping engine is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In a computer system that includes both three dimensional rendering and video, a system that reuses gates for the hardware assist for both 3D rendering and stretch blitting is implemented. The calculations used for stretch blitting and 3D rendering are similar. Therefore, a 3D pipeline used for rendering three dimensional images may be used, with modifications, to up-scale and down-scale, filter, change the surface format, and change the color space for video imaging. This type of image manipulation is referred to as stretch blitting. The image manipulator is implemented in the 3D pipeline using the texture mapping engine, as will be described below. This is advantageous because the number of gates used for the modification of the 3D pipeline to permit image manipulation, compared to separately implementing these functions, is significantly reduced.

Using a 3D pipeline to perform stretch blitting results in improved performance, and saving the gates that would be needed for an isolated stretch blit engine. The stretch blit engine is also improved by taking advantage of the functionalities of the 3D pipeline by having better scaling and filtering. Furthermore, the highly pipelined format of a 3D pipeline is used advantageously to increase performance of the stretch blitter.

A number of changes from a standard 3D pipeline are implemented. The setup engine and windower are modified to permit the 3D pipeline to handle rectangles in addition to triangles. Furthermore, the mapping address generator is modified to permit addressing in 4:2:2 and 4:2:0 data. Additionally, the cache is modified to permit addressing of these types of data. All of these changes are discussed in more detail below.

Figure 1:
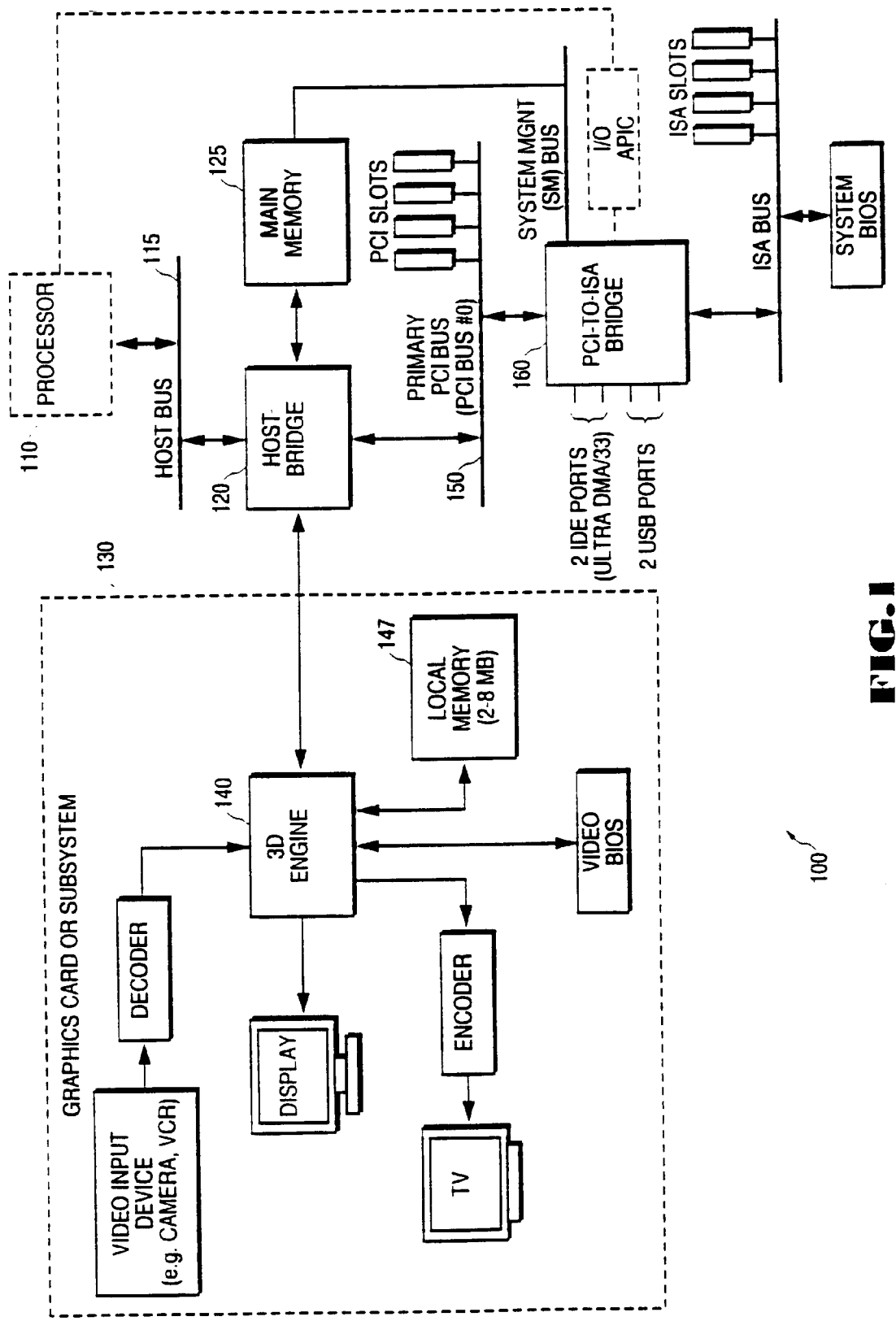
FIG. 1 is a block diagram of a computer system in which the present invention may be implemented.

FIG. 1 is a block diagram of a computer system in which the present invention may be implemented. The system may include one or more processors 110. The processors 110 may be coupled to a host bus 115. The host bus 115 may be coupled to a host bridge 120, to couple the graphics card or graphics subsystem 130 to the processors 110. A memory 125 may also be coupled to the host bridge 120. The host bridge 120 may further be coupled to a system bus 150, such as a PCI bus 150. The PCI bus 150 may be coupled to a PCI-to-ISA Bridge 160. Ports as well as an extension ISA bus may be coupled to the PCI-to-ISA bridge 160.

The graphics accelerator 130 includes a 3D engine 140 for rendering three-dimensional images. As will be described below, the 3D engine 140 may further be used for stretch blitting. Various input and output devices may be coupled to the graphics card 130, such as video input, a display, a television, etc. The graphics card 130 further may include local memory 147, for speeding up graphics operations. Furthermore, the central unit 140, 145 may include local cache memory, as will be described below. The graphics card 130 may be coupled to the host bridge 120 via a bus 135, or a similar connection means.

Figure 2:
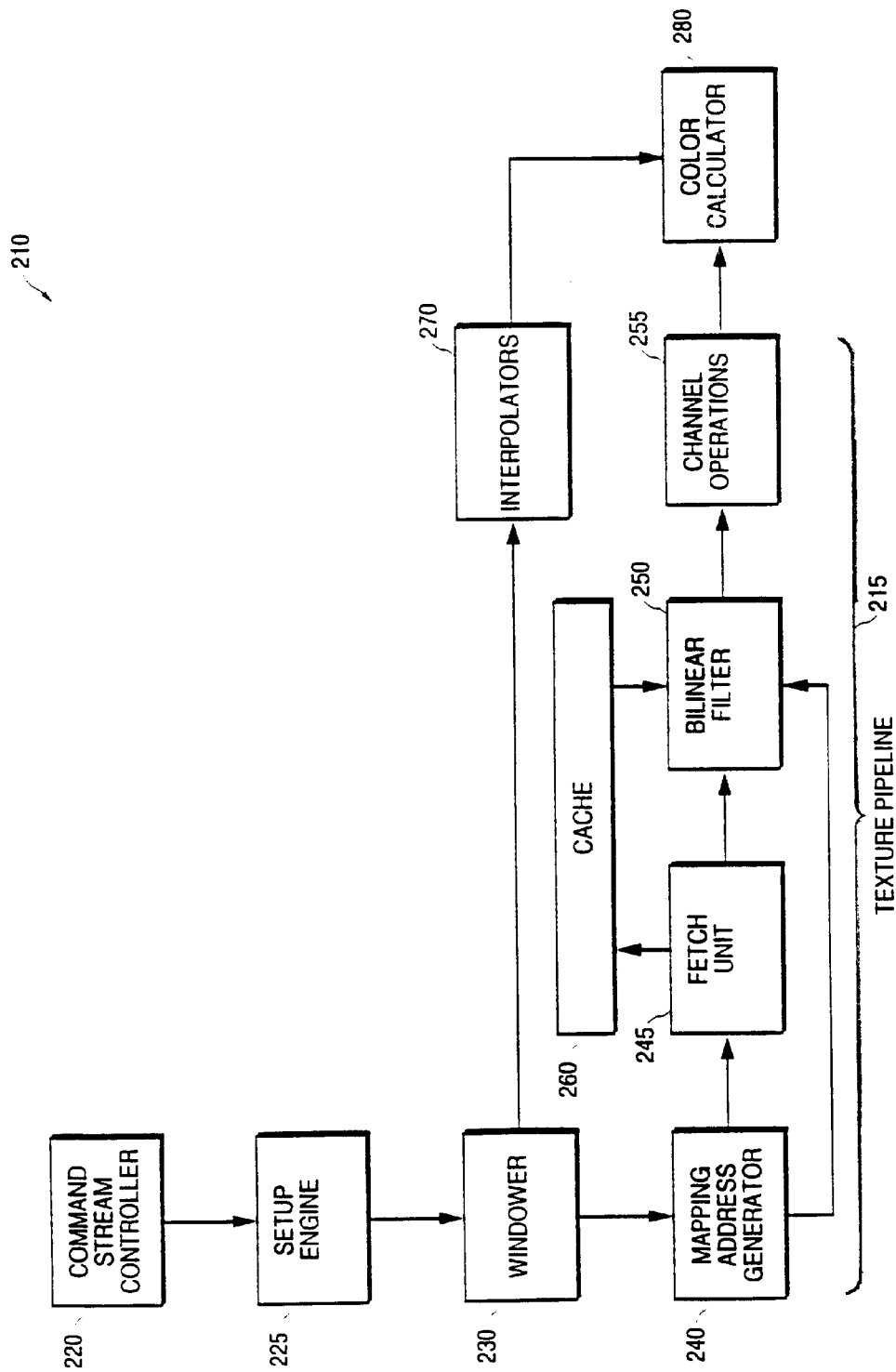
FIG. 2 is a block diagram of one embodiment a 3D pipeline for manipulating video images.

FIG. 2 is a block diagram of a 3D pipeline. The 3D engine 210 includes a texture pipeline 215. This 3D engine may be used for three-dimensional rendering, as is known in the art. The 3D pipeline may also be used for stretch blitting, as will be described below. In one embodiment, stretch blitting decoding is performed in response to a particular command referred to herein as the GFXPRIMITFVE with the rectangle primitive type specified (hereinafter referred to as GFXrectangle command); however, other command names and formats can also be used.

Command stream controller 220 is coupled to receive commands from an external source, for example, a processor or a buffer. Command stream controller 220 parses and decodes the commands to perform appropriate control functions. If the command received is not a GFXrectangle command, command stream controller 220 passes control signals and data to setup engine 225. Command stream controller 220 also controls memory management, state variable management, two-dimensional operations, etc. for non-GFXrectangle commands.

In one embodiment, when command stream controller 220 receives a GFXrectangle command, the vertex information is sent to the setup engine 225. In one embodiment, command stream controller 220 provides setup engine 225 with the upper left, lower right, and lower left vertices of the rectangle. Vertices are used by the setup engine 225 to compute three terms of a plane equation: rate of change of attribute with respect to X, with respect to Y, and an initial point.

In addition, when texture mapping is being performed, setup engine 225 determines a bounding box that contains a triangle defined by the vertices.

The setup engine 225 receives an upper left vertex, lower right vertex, and lower left vertex of the destination location from the command stream controller 220. The setup engine 225 also receives a second set of coordinates at each vertex, defining the originating size. The setup engine 225 computes the ratio of the two sets of coordinates, to determine the factor of stretching, either expansion or reduction in size. The destination coordinates are window relative, while the coordinates for the source are relative to the upper left corner of the source image, i.e. the upper left coordinates are always 0,0. Note that the setup engine equation is a subset of the calculations done for a triangle for 3D rendering. Therefore, no additional hardware is needed. The setup engine 225 further generates an edge, defining the bounding box of the rectangle primitive. Setup engine 225 provides the bounding box information to windower 230.

The windower 230 produces addresses for the destination surface. Windower 230 identifies regions of an image for processing. The windower 230 generally produces these addresses by drawing lines through each pair of vertices. The area over the top line 510 is labeled negative, while the area under the top line 510 is valued positive. The area under the bottom line 520 is labeled negative, while the area over the bottom line 520 is valued positive. The area on the inside of the edge line 530 is valued positive, while the area on the outside of the edge line 530 is labeled negative. This is called the edge test. The windower 230 calculates the addresses of all pixels that pass all three edge tests.

Figure 5A:
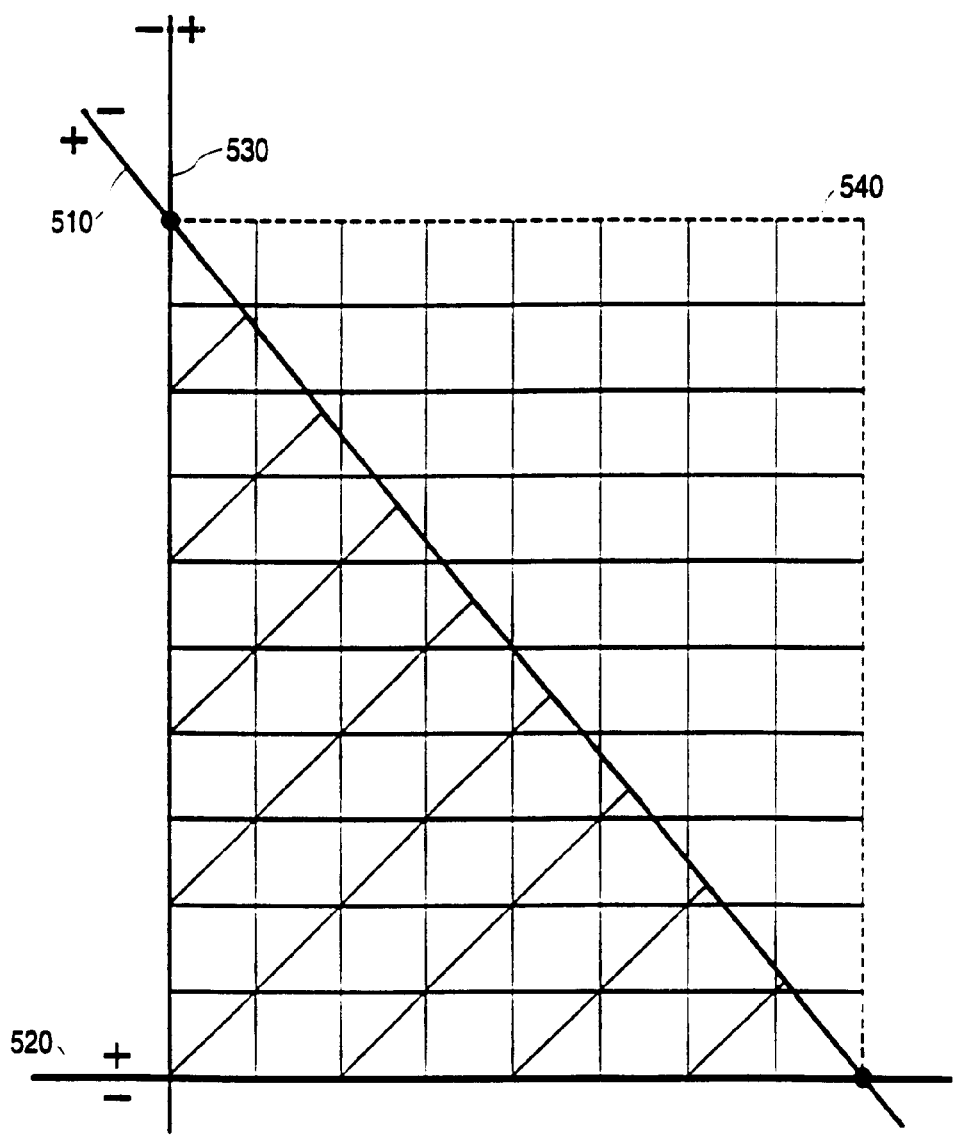
FIG. 5 illustrates the edge test performed by the windower for 3D rendering and for stretch blitting.
Figure 5B:
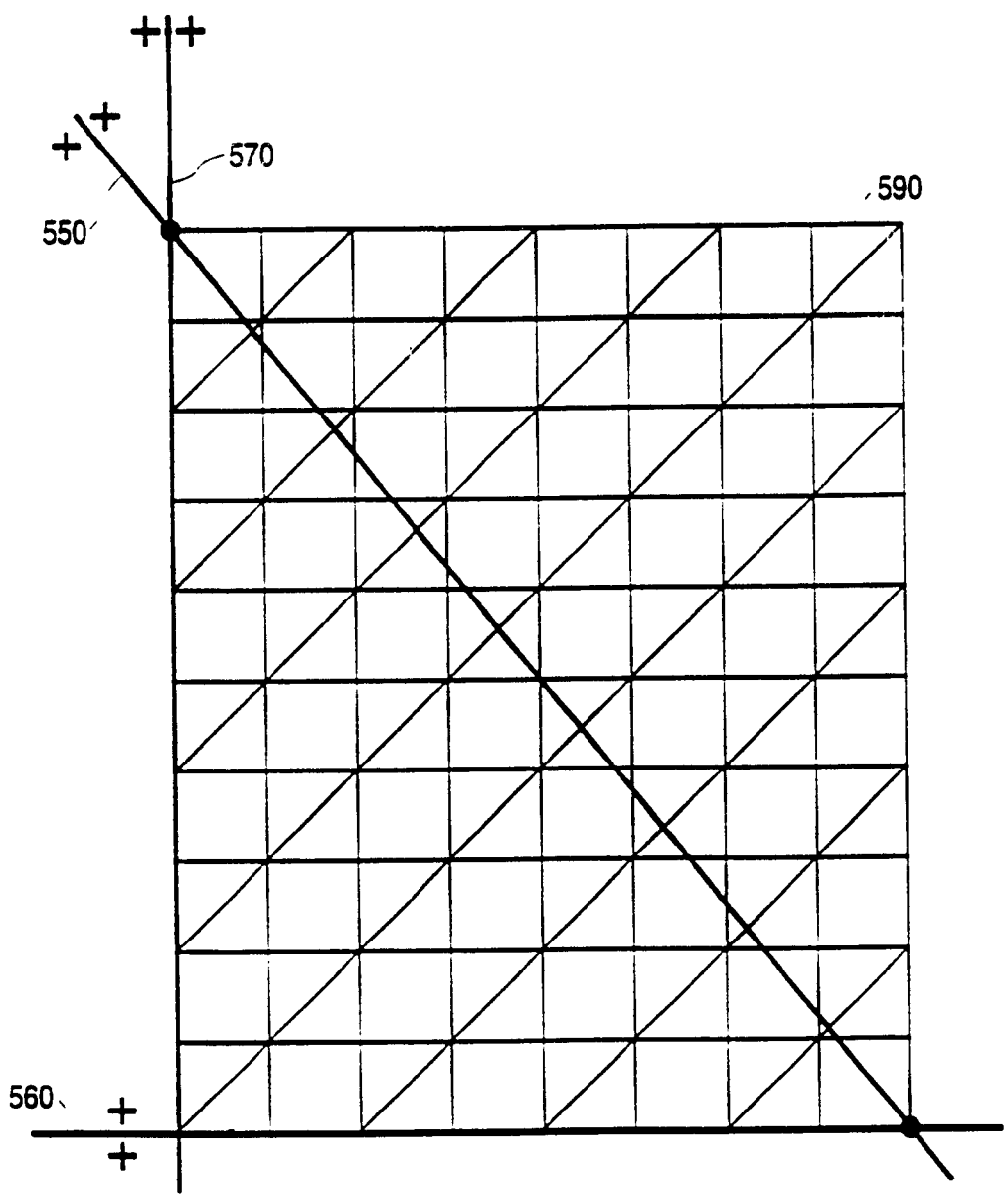

This defines the triangle 540 that is being displayed. This is illustrated in FIG. 5.

For stretch blitting, another aspect of the windower 230 is used. The windower 230 can never display an area that is outside the bounding box 590 that was passed to the windower 230 by the setup engine 225. Therefore, the edge test is forced to be always positive, thereby defining the area as the full area of the boundary box 590. Windower 230 iterates the pixels within the bounding box to generate read and write addresses for data written by the GFXrectangle command. In other words, the triangle edge equations are always passed, which allows windower 230 to process the entire rectangle rather than stopping at a triangle boundary. These read and write addresses are passed to the mapping address generator.

The windower 230 generates pixel read and write addresses to access data to a cache memory, not shown in FIG. 2. Windower 230 also provides destination terms for the alpha blending step to the color calculator 280. The windower 230 obtains the destination information from the frame buffer.

The windower 230 takes advantage of the deep pipelining available in the 3D pipeline. When the windower 230 receives the bounding box and vertices from the setup engine 225, the windower 230 starts generating addresses. The data for these addresses are fetched from memory. Memory has a relatively long latency. Therefore, as the windower 230 generates addresses, requests for the data are pipelined, and the control section of each request is placed in a FIFO. Thus, requests for data, for each address generated, is continuously sent to memory as the address is generated. Thus, the memory latency only affects the first pixel data requested. By pipelining, the effect of memory latency is eliminated for subsequent pixel data, and a pixel can be produced at every clock, sustaining throughput. Pipelining is expensive in terms of area, and reusing the pipelining already present for the 3D engine is advantageous.

The mapping address generator 240 generates actual addresses to fetch specific pixels in the texture map. In one embodiment the mapping address generator 240 calculates the destination area according to the following equation:

$$u(x, y) = \frac{C_{xS} \cdot x + C_{yX} \cdot y + C_{0S}}{C_{xiW} \cdot x + C_{yiW} \cdot y + C_{0iW}} + P_{0u}$$

This equation is known to those familiar with 3D rendering.

By using the values in the table below, complex texture mapping equations can be simplified for use for stretch blit calculations, thereby allowing hardware to be used for both purposes. $C_{xs}$, and $C_{ds}$ are delivered directly to mapping address generator 240 as plane coefficients.

| Variable | Description | Value |
|---|---|---|
| $C_{xS}$ | Rate of change of S (horizontal dimension in source surface) with respect to x | computed by setup engine |
| $C_{0S}$ | Offset to S | computed by setup engine |
| $C_{yS}$ | Rate of change of S with respect to y | computed by setup engine |
| $C_{xT}$ | Rate of change of T with respect to x | computed by setup engine |
| $C_{0S}$ | Offset to T | computed by setup engine |
| $C_{yT}$ | Rate of change of T with respect to y | computed by setup engine |
| $C_{xiW}$ | Rate of change of 1/W with respect to x | set to 0.0 |
| $C_{0iW}$ | Offset to 1/W | set to 1.0 |
| $C_{yiW}$ | Rate of change of 1/W with respect to y | set to 0.0 |
| $P_{Ou}$ | Offset to u | computed by setup engine, but normally 0.0 |
| $P_{Ov}$ | Offset to v | computed by setup engine, but normally 0.0 |

This forces the denominator in the above equation to a one. This results in the simplified equation:

$$u(x,y) = C_{xS} \cdot X + C_{yX} \cdot Y + C_{0S}$$

which defines a simple plane Ax+By+C. The mapping address generator 240 is further modified to accept non-normalized values for vertices. Video addresses are generally not normalized, while 3D rendering coordinate sets are generally normalized. By modifying the values that the mapping address generator 240 can operate on, the 3D pipeline is made useable for stretch blitting.

Fetch unit 245 performs memory management and serialization. The fetch unit 245 services requests to source maps, which are stored in the cache 260 or in memory. The fetch unit 245 converts the read addresses provided by mapping address generator 240 to cache addresses. The cache addresses generated by fetch unit 245 are sent to cache 260. If the data is not found in the cache 260, the fetch unit 245 requests the data from memory, and places it in the cache when the data arrives.

The pixel data stored in the cache address is sent to filter 250. Mapping address generator 240 sends fractional pixel positioning data and cache addresses for neighboring pixels to filter 250. Filtering techniques are well known in the art and not discussed further herein.

The interpolator 270 may be used for generating an interpolated alpha value for blending. Alpha blending allows the part of the image already in the frame buffer and the part of the source image to be seen. The term a defines the opacity of the source. For one embodiment, the alpha value is fixed for the stretch blitting, and the interpolator 270 is not used. If the alpha value is not fixed, the same equation as described above with respect to the mapping address generator 240 is used. For another embodiment, alpha values at all three vertices are specified, and the interpolator 270 generates a smooth blending between the alpha values at the vertices. The alpha values are passed to the color calculator 280.

One embodiment of color space conversion and channel assignment formats are illustrated in the table below.

| Source Surfaces → Destination | Operation | Source Surface | Destination Surface |
|---|---|---|---|
| 4:2:0 → 4:2:0 | Motion Compensation & Arithmetic Stretch Blit | Each channel of the 4:2:0 surface is processed separately, requiring 3 passes | 4:2:0 |
| 4:2:0 → 4:2:2 | Arithmetic Stretch Blit | 4:2:2 | Each channel of the 4:2:0 surface is processed separately, requiring 3 passes. |
| 4:2:2 → 4:2:2 | Arithmetic Stretch Blit | 4:2:2 | 4:2:2 |
| 4:2:2 → 4:2:0 | Arithmetic Stretch Blit | 4:2:2 | Each channel of the 4:2:0 surface is processed separately, requiring 3 passes. |
| 4:2:2 → 16 bpp RGB | Arithmetic Stretch Blit | 4:2:2 with Color Space conversion | 16 bpp surface |
| 8 bpt Y → 16 bpp RGB | 3D Rendering with texture compositing | Luminance texture map modulates another map | 16 bpp back buffer |
| 16 bpt AI → 16 bpp RGB | 3D Rendering with texture compositing | Alpha & Intensity texture map blends and/or modulates another map | 16 bpp back buffer |
| 8 bpt Index RGB → 16 bpp RGB | 3D Rendering | 8 bit index for palettized texture maps | 16 bpp back buffer |
| 16 bpt RGB → 16 bpp RGB | 3D Rendering | 16 bpt texture map | 16 bpp back buffer |

For another embodiment, other destination surfaces may be generated from the supported source surfaces and output modes.

Channel operations unit 255 performs color channel assignment operations (Y,U, and V channels). It also performs color space conversion from YUV to RGB. For another embodiment, the channel operations unit 255 may do both channel assignment and color space conversion. For one embodiment, three passes are used for the YUV channel conversion. First, each pixel is up-sampled to a 4:4:4 format, interpolating U and V values for intermediate pixels. Surface format conversion may then occur in three passes. In a first pass, the Y value is written, in a second pass the U value is written, and in a third pass the V value is written. This provides an inexpensive conversion from planar to packed formats, and does not require three address streamers. These conversions may be used for video conferencing and other applications.

For one embodiment, channel assignment from 4:2:0 to 4:2:2 is done in data alignment registers of the color calculator 280.

For one embodiment, the color calculator 280 uses, among others, the following blend equation:

color=α*source+(1−α)*dest

The color calculator 280 receives three incoming values, the source color from the channel operations unit 255, the destination color from memory, fetched by windower 230, and the alpha value (which may be fixed) from the interpolator 270. The packing logic in the color calculator 280 aligns data and writes it to the destination surface.

Figure 3:
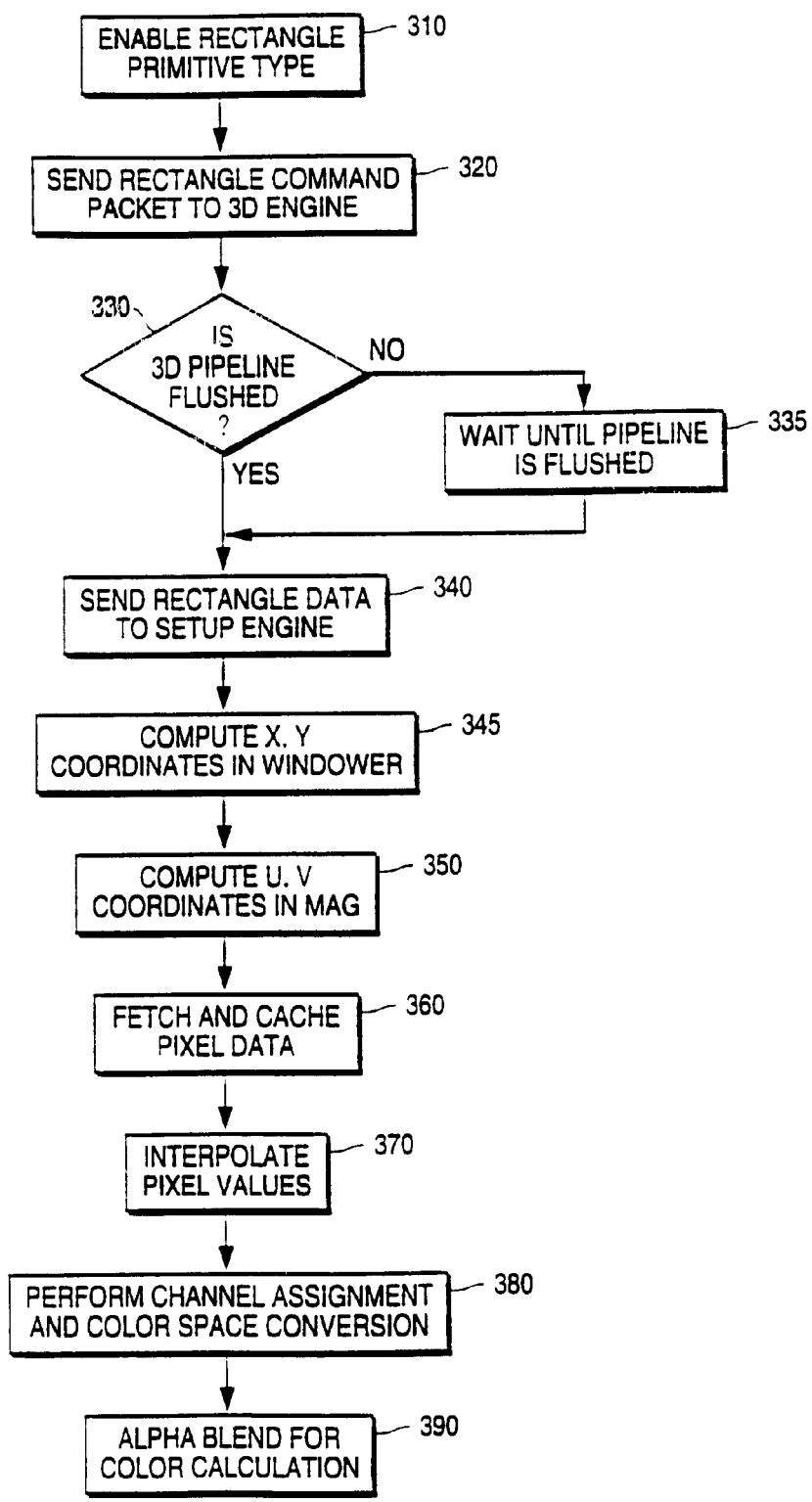
FIG. 3 is a flowchart of one embodiment of the process of video image stretching.

FIG. 3 is a flowchart of the process of image stretching. At block 310, the rectangle primitive type is enabled. The rectangle primitive type permits the 3D engine to recognize an object described by three points as a rectangle. The rectangle is an axis aligned rectangle described by three vertices in the correct winding order consistent with the culling order enabled. The vertices describe a right triangle where the base of the triangle is parallel to the x-axis and the vertical leg of the triangle is parallel to the y-axis. The fourth point is known based on the three vertices. For one embodiment, if the rectangle primitive type is already enabled when the stretch blitting is started, this step may be omitted.

At block 320, the rectangle command is sent to the 3D engine. The rectangle command indicates to the 3D engine that the following information will be stretch blitting, rather than three dimensional rendering information.

At block 330, the process tests whether the 3D pipeline is flushed. Because the 3D pipeline permits parallelism, for one embodiment, it is flushed prior to the initialization of the video stretching. For one embodiment, this step and step 335 may be omitted. If the 3D pipeline is not flushed, the process continues to block 335, where the process waits until the 3D pipeline is flushed. The process then continues to block 340. If the 3D pipeline is already flushed, the process continues directly to block 340.

At block 340, rectangle data is sent to the setup engine 225 in the 3D pipeline 210. The rectangle data defines the rectangles of data that are operated on.

At block 345, the XY coordinates are computed in the windower. The XY coordinates define the image destination surface.

At block 350, the UV coordinates are computed in the mapping address generator (MAG). The U and V coordinates define an image source surface.

At block 360, the pixel data is fetched and cached. For one embodiment, this occurs after the pixel addresses are generated. For one embodiment, the pixel data is cached in 4×4 blocks of data.

At block 370, the pixel values are interpolated. This generates the attributes for each of the pixels in the destination surface.

At block 380, channel assignment and color space conversion steps are performed. For one embodiment these steps are only performed when requested. For another embodiment, these steps are always performed.

At block 390, the color calculator alpha blends the data, aligns the data and writes it to the destination surface. This produces the destination image. At the end of this process each of the pixels in the destination image are known, and the destination image is displayed.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A 3D pipeline used for three-dimensional rendering and stretch blitting, the 3D pipeline for stretch blitting comprising:
   command stream controller to enable a rectangle mode;
   windower to produce addresses for the rectangle defined by vertices;
   a filter to interpolate between neighboring points based on relative locations, for each pixel, to generate attributes for each pixel; and
   a color calculator to align output data and write the output data to a destination surface.

2. The 3D pipeline of claim 1, further comprising:
   a setup engine to compute a rate of change of attribute with respect to X and Y and initial point resulting in a ratio of coordinates of source and destination address and generating a bounding box defining the rectangle passed to the windower.

3. The 3D pipeline of claim 1, further comprising:
   a mapping address generator to generate actual addresses to fetch specific pixels in a pixel map.

4. The 3D pipeline of claim 3, wherein the mapping address generator utilizing non-normalized values for vertices.

5. The 3D pipeline of claim 1, further comprising:
   a fetching unit to provide memory management, and cache handling.

6. The 3D pipeline of claim 1, further comprising:
   a channel operations unit to perform a channel conversion within a YUV space.

7. The 3D pipeline of claim 6, wherein the conversion is from a 4:2:2 to a 4:2:0 YUV space.

8. The 3D pipeline of claim 1, wherein the color calculator is further to perform a color space conversion.

9. The 3D pipeline of claim 8, wherein the color space conversion is from YUV to RGB.

10. The 3D pipeline of claim 1, further comprising: an interpolator to generate alpha values for alpha blending.

11. The 3D pipeline of claim 10, wherein the color calculator is further for alpha blending of the output data using the alpha values provided by the interpolator.

12. The 3D pipeline of claim 1, wherein the windower produces addresses for a destination surface.

13. The 3D pipeline of claim 12, wherein the destination surface is produced by force passing an edge test for an entire bounding box defining the rectangle passed to the windower.

14. The 3D pipeline of claim 1, wherein the windower using a deep pipelining to generate addresses continuously, and sending the addresses continuously to a memory as generated, thereby reducing an effect of memory latency.

15. A method in a three dimensional (3D) pipeline comprising:
   receiving a signal;
   receiving two or more coordinate points defining an area;
   determining if the area is a triangle or a rectangle based on the signal; and
   generating a 3D image based on data for the area if the area is a triangle; and
   executing a stretch-blitting operation on the data for the area if the area is a rectangle.

16. The method of claim 15, further comprising:
setting a state for the 3D pipeline based on the signal, the state indicating whether the coordinate points define a video image or a three-dimensional image for rendering.

17. The method of claim 15, further comprising:
flushing the 3D pipeline prior to processing the data if the area is a rectangle.

18. The method of claim 15, wherein said signal is a rectangle command.

19. The method of claim 15, wherein the plurality of coordinate points comprise three points defining an upper left vertex, a lower right vertex, and a lower left vertex of a right triangle, the rectangle defined by determining the upper right vertex.

20. A method of stretch blitting digital video data in a three-dimensional (3D) pipeline, the method comprising:
receiving a rectangle command;
receiving an upper left, lower right, and lower left vertex defining a right triangle;
identifying a bounding box defining a rectangle;
computing an image destination surface;
computing an image source surface;
fetching and caching pixel values;
interpolating the pixel values to generate pixels in the destination surface; and
displaying the destination surface.

21. The 3D pipeline of claim 1, wherein the 3D pipeline is flushed prior to processing the data if the area is a rectangle.

22. The 3D pipeline of claim 1, wherein the windower receives a plurality of coordinate points comprising three points defining an upper left vertex, a lower right vertex, and a lower left vertex of a right triangle, the windower further to calculate the upper right vertex for the rectangle.

23. A computer system comprising:
a processor;
memory;
a 3D pipeline for three dimensional rendering and stretch blitting, the 3D pipeline comprising:
a command stream controller to receive a signal;
a windower to receive two or more coordinate points defining an area and to determine if the area is a triangle or a rectangle based on the signal; and
the 3D pipeline to generate a 3D image based on data for the area if the area is a triangle and the 3D pipeline to execute a stretch-blitting operation on the data for the area if the area is a rectangle.

24. The computer system of claim 23, wherein the 3D pipeline further comprises:
a setup engine to compute a rate of change of attribute with respect to X and Y and initial point resulting in a ratio of coordinates of source and destination address and generating a bounding box defining the rectangle passed to the windower.

25. The computer system of claim 23, wherein the 3D pipeline further comprises a fetching unit to provide memory management, and cache handling.

26. The computer system of claim 23, wherein the windower produces addresses for a destination surface.

27. The computer system of claim 26, wherein the destination surface is produced by force passing an edge test for the entire bounding box.

28. The computer system of claim 26, wherein the windower receives a plurality of coordinate points comprising three points defining an upper left vertex, a lower right vertex, and a lower left vertex of a right triangle, the windower further to calculate the upper right vertex for the rectangle.

29. The computer system of claim 23, wherein the windower using a deep pipelining to generate addresses continuously, and sending the addresses continuously to a memory as generated, thereby reducing an effect of memory latency.

30. The computer system of claim 23, wherein the 3D pipeline is flushed prior to processing the data if the area is a rectangle.

* * * * *